United States Patent Office 2,968,630
Patented Jan. 17, 1961

2,968,630

RUBBER ANTIOXIDANT AND METHOD OF PREPARATION

Dante A. Pillon, New Brunswick, and Earl Kaplan, North Plainfield, N.J., assignors to American Cyanamid Company, New York, N.Y., a corporation of Maine No Drawing. Filed Dec. 26, 1957, Ser. No. 705,112

3 Claims. (Cl. 252—403)

This invention relates to rubber antioxidants. More particularly, it relates to 2,2′-methylene-bis-4,6-dialkyl phenols and the preparation thereof. Still more particularly, it relates to such bis-dialkylphenols which are especially adapted for forming highly fluid aqueous dispersions for use in rubber latex.

Many chemical compounds have demonstrated the characteristic to one degree or another of inhibiting the deteriorating action of oxygen on vulcanized rubber. Among the more outstanding of these are certain 2,2′-methylene-bis-4-alkyl-6-t-alkyl phenols in which the alkyl and t-alkyl radicals are of 1–3 and 4–8 carbon atoms respectively. Incorporation into dry rubber of any of the compounds belonging to this class of antioxidant is readily accomplished along with the other compounding ingredients by mechanical mixing, and presents no problem. The same is not true, however, when preparing rubber latex compositions for use in the production of rubber layers, films, threads, foam rubber and the like.

Distribution of antioxidants in latex is conducted in various ways according to their different physical properties. For instance, water-soluble antioxidants may be dissolved directly into latex and thus become uniformly distributed in the final rubber product. Unfortunately, few, if any, satisfactory water soluble antioxidants are available. On the other hand, the distribution of solid water-insoluble antioxidants, such as the bis-dialkylphenols of this invention, is not so simple. The usual procedure is to form a fine aqueous dispersion of the antioxidant prior to its addition to latex. Such a dispersion usually runs about 50% solids and is formed by milling the antioxidant in water in a ball or colloid mill using a suitable dispersing agent.

Aqueous dispersions thus formed of the bis-dialkylphenols of this invention, however, have not been satisfactory for commercial application because of their thixotropic nature. The extent to which each antioxidant dispersion suffers from this phenomenon may vary with each antioxidant and often varies with different batches of the same antioxidant. Thus, the dispersion may be fluid when first prepared only to turn into an unpourable, unpumpable mass in a period of a few minutes. In other instances, the dispersion may have no fluidity from the beginning. The disadvantages of such antioxidants to the latex industry are obvious and are such as to dictate the use in latex of other antioxidants, even those which are inferior in their inhibiting action to the bis-dialkylphenols.

There has remained, therefore, a need for a means for rendering 2,2′-methylene-bis-4,6-dialkylphenols more suitable for use as antioxidants in rubber latex. It is a principal object of this invention to provide this need and to overcome the disadvantages noted above. It is a further object of this invention to provide 2,2′-methylene-bis-4,6-dialkylphenols which are characterized in that aqueous dispersions thereof may be prepared which have initially, and retain for extended periods of time, a high fluidity so that they may be readily handled by pumps and allied equipment. It is a further object of this invention to provide a method for preparing such bis-dialkylphenols. It is a still further object of this invention to obtain such an antioxidant by a method which involves no additional equipment requirements nor personnel supervision, and does not produce a product which in any way adversely affects the subsequent rubber latex vulcanization process or the vulcanizate so obtained.

The 2,2′-methylene-bis-4,6-dialkylphenols of this invention may be represented by the formula

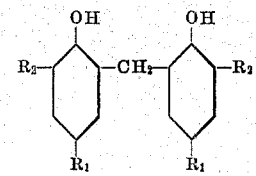

in which $R_1$ is an alkyl radical of 1–3 carbons and $R_2$ is a tertiary alkyl radical of 4–8 carbons. They are readily prepared by reacting at an elevated temperature a dialkylphenol with formaldehyde using an acid catalyst. This reaction may be conducted, for instance, in an organic solvent as described in U.S. Patent No. 2,538,355, or in an aqueous reaction medium as more fully described in U.S. Patents No. 2,796,444, 2,796,445 and 2,773,100, the particular method of preparation forming no part of this invention.

According to the present invention, the objects set forth above are met in a simple yet extremely effective manner. In general, the method of this invention comprises preparing a 2,2′-methylene-bis-dialkylphenol as above described with the modification that a solution of dimethylolethyleneurea is added to the reaction mixture. During the reaction of the dialkylphenol and formaldehyde, a self condensation product of the dimethylolethyleneurea is formed and is believed to be of the formula

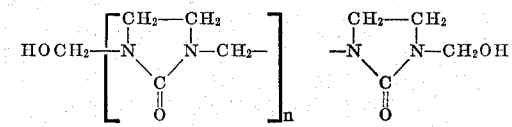

in which $n$ is 1 or more. Exceptionally good results are obtained when "$n$" varies from about 2–10. The approximate molecular weights of such condensation products will range from about 200–1000. It is the presence of such a self condensation product which imparts to the antioxidant the surprising characteristic permitting the formation of aqueous dispersion thereof which are not only highly fluid but which retain this fluidity for extended periods as well.

These results are obtained by employing as little as 0.5% of condensation product on the weight of antioxidant. Amounts greater than about 5.0% should preferably not be employed since, quite surprisingly, these greater amounts appear to produce a thickened product. As a usual practice, an amount of from about 1.0–3.0% will be found adequate to obtain the desired fluidity. The amount of dimethylolethyleneurea employed in preparation of the bis-dialkylphenol will be governed accordingly.

The following examples further illustrate the present invention. All parts are by weight unless otherwise noted.

Example 1

A mixture of 1050 parts of water, 319 parts of mono-t-butyl-p-cresol, 4 parts of sequestering agent (Versenol 120), 9 parts of sodium decyl toluene sulfonate and 25 parts of 75% phosphoric acid is heated to 90° C. 80 parts of 37% formalin solution is then added and the mixture agitated at 90–95° C. for 90 minutes. After neutralization with 15 parts of 25% sodium hydroxide solution, the mixture is cooled and the solid product removed by filtration, washed and dried. A 50% aqueous dispersion of the dry powdered product prepared using a dispersing agent (Daxad 11) turns almost completely solid after standing about 20 minutes.

*Example 2*

The procedure of Example 1 is repeated except that 18 parts of a 50% dimethylolethyleneurea solution is added to the mixture shortly after the addition of the formalin. A 50% aqueous dispersion of the dry powdered product prepared as in Example 1 remains highly fluid after standing for 16 hours. The 2,2'-methylene-bis(4-methyl-6-t-butyl phenol) employed to prepare the dispersion contains 3 parts of a self condensation product of dimethylolethyleneurea per 100 parts of dialkyl phenol.

*Example 3*

The procedure of Example 2 is repeated replacing the mono-t-butyl cresol with an equivalent amount of 2-tert-butyl-4-ethyl phenol. A 50% aqueous dispersion made from the dry powdered 2,2'-methylene-bis(4-ethyl-6-t-butyl phenol) thus obtained exhibits similar fluidity characteristics as the dispersion of Example 2.

We claim:

1. In preparing a 2,2'-methylene-bisdialkylphenol of the formula

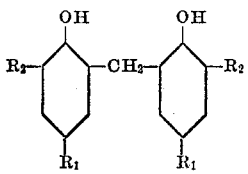

in which $R_1$ is an alkyl radical of 1–3 carbon atoms and $R_2$ is a tertiary alkyl radical of 4–8 carbon atoms, by a known process in which a dialkylphenol is reacted with formaldehyde at an elevated temperature in the presence of an acid catalyst; the method of imparting to said product bis-dialkylphenol the ability to form highly-fluid dispersions which retain their fluidity for extended periods of time which method comprises: conducting said reaction in the presence of a sufficient amount of dimethylolethyleneurea to form in situ a self-condensation product thereof in amount of from at least about 0.5 to about 5.0 weight percent of said product bis-dialkylphenol, said self-condensation product having a molecular weight in the range from about 200 to about 1000 and being represented by the formula

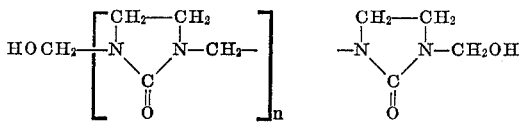

in which $n$ is a number from above 1 to about 10.

2. A process according to claim 1 in which the bisphenol is 2,2'-methylene-bis(4-methyl-6-t-butyl phenol).

3. A process according to claim 1 in which the bisphenol is 2,2'-methylene-bis(4-ethyl-6-t-butyl phenol).

References Cited in the file of this patent

UNITED STATES PATENTS

| | | |
|---|---|---|
| 2,000,152 | Walker et al. | May 7, 1935 |
| 2,467,705 | Sturgis | Apr. 19, 1949 |
| 2,538,355 | Davis et al. | Jan. 16, 1951 |